Patented July 31, 1928.

1,678,630

UNITED STATES PATENT OFFICE.

HANS BÄHR, OF CHICAGO, ILLINOIS, ASSIGNOR TO I. G. FARBENINDUSTRIE AKTIEN-GESELLSCHAFT, OF FRANKFORT-ON-THE-MAIN, GERMANY, A CORPORATION OF GERMANY.

METHOD OF CONVERTING HYDROGEN SULPHIDE INTO SULPHUR DIOXIDE.

No Drawing. Application filed May 4, 1925, Serial No. 28,018, and in Germany May 6, 1924.

This invention relates to an improved method of converting hydrogen sulphide ($H_2S$) contained in fuel gases, into sulphur dioxide ($SO_2$), such as in coke oven gas, illuminating gas, blast furnace gas, producer gas, etc., for the purpose of cleaning such gases.

Heretofore, and in such cases where the elimination of hydrogen sulphide ($H_2S$) has been based on the absorption of hydrogen sulphide ($H_2S$), considerable difficulty and disadvantage has always been encountered, due to the small power of reaction of hydrogen sulphide ($H_2S$).

For this reason attempts have been made to discard the process of elimination of hydrogen sulphide ($H_2S$) by absorption entirely, and employ processes of converting hydrogen sulphide ($H_2S$) into sulphur dioxide ($SO_2$) by oxidation.

This sulphur dioxide ($SO_2$) thus formed is a very much stronger acid and reacts very much easier on other gases and can therefore be eliminated out of the fuel gas with very much simpler means.

In the method described in German patent to Burkheiser, 220,632, class 26d, group 8, he mixed one-third ($\frac{1}{3}$) of the fuel gas with air or oxygen and converted the hydrogen sulphide ($H_2S$) of this one-third ($\frac{1}{3}$) of the fuel gas into sulphur dioxide ($SO_2$) by leading it over a contact element. The hydrogen sulphide ($H_2S$) of the remaining two-thirds ($\frac{2}{3}$) of the fuel gas was reduced by mixing it with the first one-third ($\frac{1}{3}$) of the fuel which contained the sulphur dioxide ($SO_2$), according to the formula:

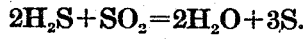

The catalytic contact (body or mass) which he used for oxidizing hydrogen sulphide ($H_2S$) consisted of annealed ferric oxide ($Fe_2O_3$).

For the reaction:

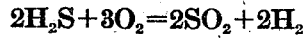

temperatures are required from 600° to 700° C. (1112° to 1292° F.) which is of great disadvantage to the other gases in the fuel gas.

For this reason it is necessary to always operate the process described in the patent referred to, alternately (intermittently) in such manner to first absorb the hydrogen sulphide ($H_2S$) and after the contact elements consisting of ferric oxide ($Fe_2O_3$) are saturated with hydrogen sulphide ($H_2S$), air is then supplied. The air thus introduced causes the oxidation of the hydrogen sulphide ($H_2S$).

With the present improved method it has been found that by proper selection of catalytic contact elements specifically adapted for the purpose, the oxidation of hydrogen sulphide ($H_2S$) can be quantitatively reached at 200° to 300° C. (392° to 572° F.). These catalytic elements may be in the form of an alloy in the shape of wire, fabric, etc., an oxide, a salt, or a coating on metal.

For this reason it is necessary that the contact elements shall be possessed of two properties essential for the oxidation of the hydrogen sulphide ($H_2S$). First the contact elements must have sufficient chemical affinity for the hydrogen sulphide ($H_2S$), that is, they must have the property of easily entering into new combinations with hydrogen sulphide ($H_2S$), and secondly, the contact elements must have the property of transferring very active oxygen.

Elements conforming with the first requirement are the heavy metals such as iron, nickel, manganese, copper, etc., and elements with oxygen transferring properties are vanadium, tungsten, etc.

By mixing the two necessary metals in shape of an alloy, or of metal chips, or metal oxides or metal salts, a contact element can be produced possessing the two required properties. In selecting the proper contact element special care is to be taken that these contact elements react on the hydrogen sulphide ($H_2S$) at as low a temperature as possible and in doing so will not cause any simultaneous reactions on the remaining gases.

In using for the oxidation of hydrogen sulphide ($H_2S$) a contact element consisting of nickel and tungsten, or nickel and vanadium, or iron and tungsten, or iron and vanadium, the quantitative conversion of hydrogen sulphide ($H_2S$) into sulphur dioxide ($SO_2$) will take place at 200° to 300° C. (392° to 572° F.) during which selective oxidation process the ammonia will remain in the gas without being exposed to the danger of being disintegrated, the gas containing the ammonia being produced preferably from any dry distillation of coal, or from any other suitable source.

The oxygen necessary for the formation of sulphur dioxide ($SO_2$) will be supplied to the gas by a small addition of air; at any rate the total amount of oxygen in the gas need not be larger than is necessary for the quantitative conversion of hydrogen sulphide ($H_2S$) into sulphur dioxide ($SO_2$). Very often even the natural content of oxygen in the gas is sufficient for this process and is supported, as has been found by experiments, by the carbon dioxide ($CO_2$) content of the gas in the oxidation of hydrogen sulphide ($H_2S$).

The higher temperature necessary for the performing of the reduction may be attained either by direct heating (electrical current through contact element) or indirect heating of the contact element, or also by heating the gas. The direct heating of the contact element has the advantage that it is possible to easily remove from time to time the tar substances which form part of the impurities of the gas and settle on the contact elements.

It is only necessary to turn on air and increase the electric current whereby the tar particles will burn off. Obviously any other suitable form of heating may be resorted to.

What is claimed as new is:—

1. The method of converting hydrogen sulphide of gases into sulphur dioxide for the purpose of purifying the gases by the employment of contact elements necessary for the oxidation, one of said elements embodying a mixture of metals having the property of binding sulphur, and an element embodying metals transmitting oxygen.

2. The method of converting hydrogen sulphide of gases into sulphur dioxide for the purpose of purifying the gases by the employment of contact elements necessary for the oxidation consisting of a mixture of metals having the property of binding sulphur, such metals being of the class of metals which includes iron, nickel, copper or the like, and metals transmitting oxygen, such latter metals being of the class which includes vanadium, tungsten.

3. The method of converting hydrogen sulphide of gases into sulphur dioxide for the purpose of purifying the gases by the employment of contact elements necessary for the oxidation consisting of a mixture of metals having the property of binding sulphur, such metals being of the class of metals which includes iron, nickel, copper or the like, and metals transmitting oxygen, such latter metals being of the class which includes vanadium, tungsten, the catalytic elements being in the form of an alloy in a suitable shape.

4. The method of converting hydrogen sulphide of gases into sulphur dioxide for the purpose of purifying the gases by the employment of contact elements necessary for the oxidation consisting of a mixture of metals having the property of binding sulphur, such metals being of the class of metals which includes iron, nickel, copper or the like, and metals transmitting oxygen, such latter metals being of the class of metals which includes vanadium, tungsten, the catalytic elements being fixed on bodies having large surfaces.

5. The method of converting hydrogen sulphide of gases into sulphur dioxide for the purpose of purifying the gases by the employment of contact elements necessary for the oxidation consisting of a mixture of metals having the property of binding sulphur, such metals being of the class of metals which includes iron, nickel, copper or the like, and metals transmitting oxygen, such latter metals being of the class of metals which includes vanadium, tungsten, the catalytic elements being heated.

6. The method of converting hydrogen sulphide of gases into sulphur dioxide for the purpose of purifying the gases by the employment of contact elements necessary for the oxidation consisting of a mixture of metals having the property of binding sulphur, such metals being of the class of metals which includes iron, nickel, copper or the like, and metals transmitting oxygen, such latter metals being of the class of metals which includes vanadium, tungsten, the gas being heated.

7. The method of converting hydrogen sulphide of gases into sulphur dioxide for the purpose of purifying the gases by the employment of contact elements necessary for the oxidation consisting of a mixture of metals having the property of binding sulphur, such metals being of the class of metals which includes iron, nickel, copper or the like, and metals transmitting oxygen, such latter metals being of the class of metals which includes vanadium, tungsten, the gas being submitted to reduction before the removal of ammonia therefrom.

In testimony whereof, I have signed my name to this specification, on this 29th day of April, A. D. 1925.

HANS BÄHR.